(12) United States Patent
Singh et al.

(10) Patent No.: US 9,126,172 B2
(45) Date of Patent: Sep. 8, 2015

(54) REFORMING EXCHANGER WITH INTEGRATED SHIFT CONVERSION

(71) Applicants: Shashi Singh, Missouri City, TX (US); Kamal Gursahani, Houston, TX (US); Robert Burlingame, Houston, TX (US); Tim Weeks, Katy, TX (US); Jim Gosnell, Houston, TX (US); Avinash Malhotra, Sugar Land, TX (US)

(72) Inventors: Shashi Singh, Missouri City, TX (US); Kamal Gursahani, Houston, TX (US); Robert Burlingame, Houston, TX (US); Tim Weeks, Katy, TX (US); Jim Gosnell, Houston, TX (US); Avinash Malhotra, Sugar Land, TX (US)

(73) Assignee: KELLOGG BROWN & ROOT LLC, Houston, TX (US)

( * ) Notice: Subject to any disclaimer, the term of this patent is extended or adjusted under 35 U.S.C. 154(b) by 0 days.

(21) Appl. No.: 14/691,108

(22) Filed: Apr. 20, 2015

(65) Prior Publication Data

US 2015/0224463 A1    Aug. 13, 2015

Related U.S. Application Data

(62) Division of application No. 13/277,690, filed on Oct. 20, 2011.

(51) Int. Cl.

| | |
|---|---|
| *C01B 3/48* | (2006.01) |
| *C01B 3/26* | (2006.01) |
| *C01B 3/02* | (2006.01) |
| *B01J 8/06* | (2006.01) |
| *C01B 3/38* | (2006.01) |

(52) U.S. Cl.
CPC ........ *B01J 8/067* (2013.01); *B01J 8/065* (2013.01); *C01B 3/382* (2013.01); *B01J 2208/00115* (2013.01); *B01J 2208/065* (2013.01); *C01B 2203/0233* (2013.01); *C01B 2203/044* (2013.01); *C01B 2203/0833* (2013.01)

(58) Field of Classification Search
CPC combination set(s) only.
See application file for complete search history.

(56) References Cited

U.S. PATENT DOCUMENTS

| | | |
|---|---|---|
| 4,741,885 A | 5/1988 | Herbort et al. |
| 5,006,131 A | 4/1991 | Karafian et al. |
| 5,011,625 A | 4/1991 | Le Blanc |
| 5,030,440 A | 7/1991 | Lywood et al. |
| 5,122,299 A | 6/1992 | Le Blanc |
| 5,181,937 A | 1/1993 | Karafian et al. |
| 5,362,454 A | 11/1994 | Cizmer et al. |
| 6,855,272 B2 | 2/2005 | Burlingame et al. |
| 7,220,505 B2 | 5/2007 | Malhotra et al. |
| 7,550,215 B2 | 6/2009 | Malhotra et al. |
| 7,635,456 B2 | 12/2009 | Burlingame et al. |
| 2001/0055560 A1 | 12/2001 | Schiodt et al. |
| 2003/0162846 A1 | 8/2003 | Wang et al. |
| 2005/0086864 A1 | 4/2005 | Burlingame et al. |
| 2008/0275143 A1 | 11/2008 | Malhotra et al. |
| 2010/0074812 A1 | 3/2010 | Burlingame et al. |

*Primary Examiner* — Kaity Handal
(74) *Attorney, Agent, or Firm* — Gary M. Machetta

(57) ABSTRACT

Reforming exchangers for syngas production are provided. The reforming exchangers can have a shell-and-tube configuration and include a shift catalyst on the shell side of the exchanger to reduce a carbon monoxide concentration in a shell side product gas mixture. Processes for forming syngas using the reforming exchangers are also provided.

8 Claims, 5 Drawing Sheets

REFORMING EXCHANGER WITH INTEGRATED SHIFT CONVERSION

CROSS-REFERENCE TO RELATED APPLICATIONS

This application claims priority to U.S. Non-Provisional patent application Ser. No. 13/277,690 which was filed on Oct. 20, 2011, the entirety of which is incorporated by reference herein.

FIELD

Embodiments described generally relate to reforming exchangers for syngas production. More particularly, such embodiments relate to reforming exchangers having a shell-and-tube configuration with shift catalyst on the shell side of the reforming exchanger to reduce carbon monoxide concentration in the shell side outlet gas. Embodiments also relate to processes for forming syngas using the reforming exchangers discussed and described herein.

BACKGROUND

Steam reforming of a hydrocarbon to produce syngas is a well known process. One popular technique is to use an autothermal reformer in conjunction with a reforming exchanger. In such processes, one or more hydrocarbons and an oxygen source are supplied to the autothermal reformer. The combustion reaction is exothermic and supplies the heat needed for the catalytic reforming reaction that occurs in the autothermal reformer, which is endothermic, to produce a relatively hot reformed gas. The hot reformed gas from the autothermal reformer is then used as a heat source in the reforming exchanger, which is operated as an endothermic catalytic steam reforming zone. In the reforming exchanger, a feed of steam and hydrocarbon(s) is passed through open-ended tubes filled with reforming catalyst. The outlet ends of the tubes discharge the endothermically reformed gas near the shell side inlet where it mixes with the hot reformed gas from the autothermal reformer. The hot gas mixture is then passed through the shell countercurrently across or along the tubes in indirect heat exchange to supply the heat necessary for the endothermic reforming reaction to occur.

Reforming exchangers are in use commercially and are available, for example, from Kellogg, Brown, & Root LLC under the trade designation KRES. Various improvements to the reforming exchanger design have been made and are disclosed in, for example, U.S. Pat. Nos. 5,362,454; 6,855,272; 7,635,456; and 7,550,215.

These and other prior art exchangers, however, can be limited in their operation due to metal dusting concerns. Metal dusting occurs under certain temperature and pressure conditions when carbon monoxide (CO) in the gas mixture on the shell side of an exchanger corrodes metal surfaces of the exchanger (such as, for example, the tubes and walls of the exchanger), forming metal powder that interferes with efficient operation of the exchanger and results in thinning of the metal surfaces. To minimize metal dusting, the shell side outlet gas must be at a temperature sufficiently higher than the critical temperature for carbon formation, which is the chemical equilibrium temperature for the Boudouard reaction:

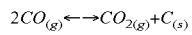

$$2CO_{(g)} \leftrightarrow CO_{2(g)} + C_{(s)}$$

As a result, the extent of high grade waste heat recovery from the system is limited. Additionally, the mixed feed to the tube side of the exchanger can need to be pre-heated to address metal dusting concerns, which increases duty on an external heat source and limits heat integration opportunities.

There is a need, therefore, for improved systems and methods for reducing the potential for metal dusting within reforming exchangers, thereby widening the operating envelope of the reforming exchangers to include pressures and temperatures previously undesirable due to the risk of metal dusting.

DETAILED DESCRIPTION

Figures 1, 2:
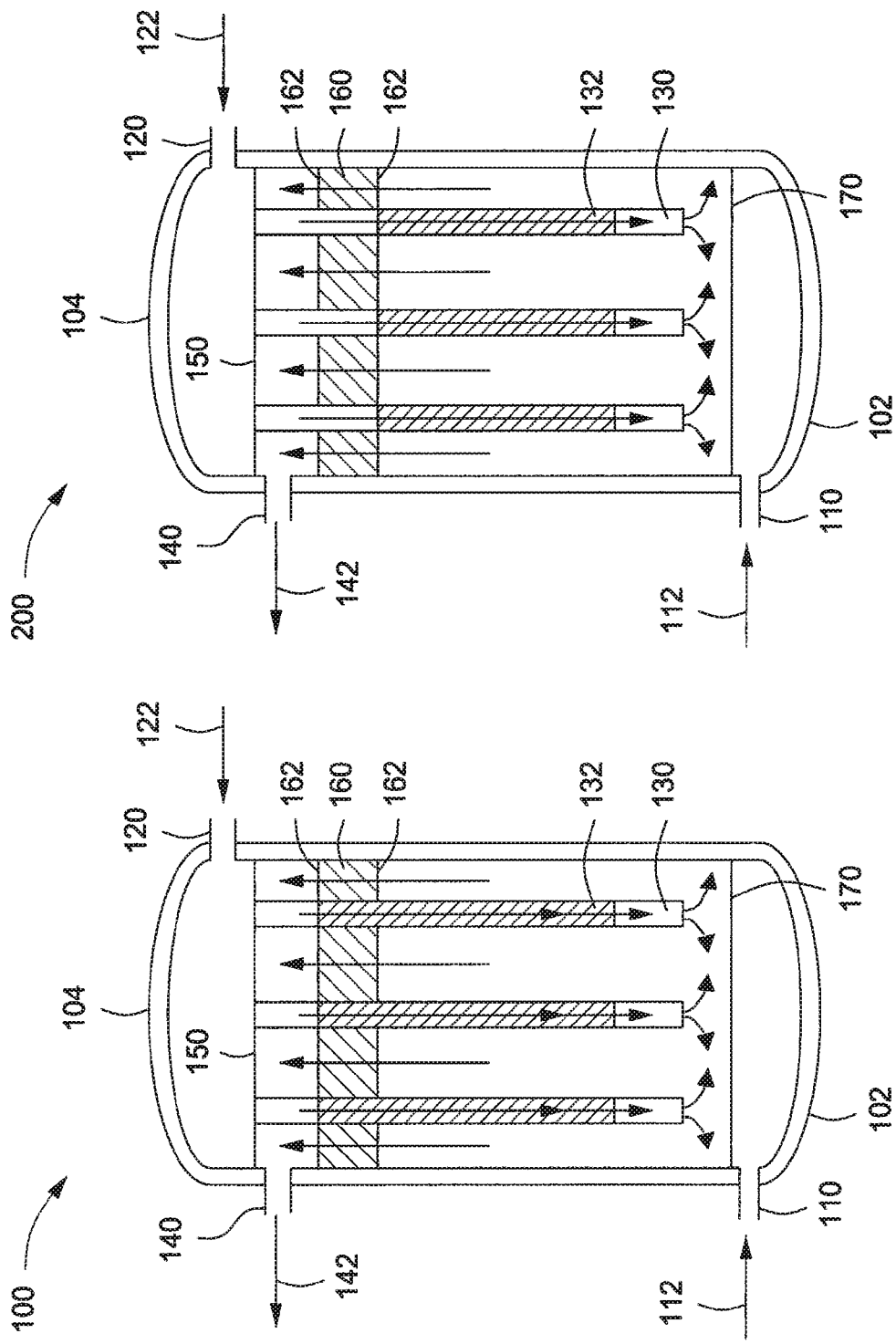
FIG. 1 depicts a cross-sectional side elevation view of an illustrative reforming exchanger with a shell-side shift catalyst bed, according to one or more embodiments described.
FIG. 2 depicts a cross-sectional side elevation of another illustrative reforming exchanger in which pre-heating of a feed to the exchanger takes place in the tubes adjacent to the shell-side catalyst bed, according to one or more embodiments described.

In one or more embodiments, a syngas reforming exchanger can include a vessel having an elongated shell, a first end, and a second end, a shell side fluid inlet adjacent the first end for receiving a hot gas feed, a tube side fluid inlet adjacent the second end for receiving a reactant feed gas, a shell side fluid outlet fluidly isolated from the tube side fluid inlet by a tube sheet adjacent the second end for discharging a reduced carbon monoxide product gas mixture. The syngas reforming exchanger can also include a tube bundle that can include a plurality of tubes. the plurality of tubes can have an inlet end secured to the tube sheet for receiving the reactant feed gas and an outlet end adjacent the shell side fluid inlet for discharging a reformed product gas into the hot gas feed to form a gas mixture. The syngas reforming exchanger can also include one or more shift catalysts for converting carbon monoxide to carbon dioxide in the gas mixture to produce the reduced carbon monoxide product gas mixture. The shift catalyst can be contained on the shell side of the reforming exchanger. The shift catalyst can be contained in a catalyst support grid on the shell side of the reforming exchanger.

In certain embodiments, the shell side flow path of the gas mixture in the reforming exchanger can be longitudinal in nature, such that the gas in the tubes and the gas in the shell flow counter-currently with respect to one another. This longitudinal shell side flow arrangement can provide efficient heat transfer with a low pressure drop in the shell side fluid. The longitudinal flow can also result in less costly reforming exchangers, since a relatively smaller shell diameter can be used when compared to exchangers employing a cross-flow or transverse flow design. As used herein, the term "longitudinal" refers to the direction corresponding to the length of the reforming exchanger, while the term "transverse" means transverse with respect to the longitudinal axis unless otherwise indicated.

In one or more embodiments, the reforming exchanger can include monolithic structures bearing reforming catalyst disposed within the tubes for converting the reactant feed gas to reformed product gas. In various embodiments, the catalyst-bearing monolithic structures can be in the form of, but are not limited to, a twisted tape insert, a central longitudinal runner with a plurality of bristles extending transversely therefrom, ceramic foam, Raschig rings, ribbed rings, or the like, or any combination thereof. In one or more embodiments, the tubes can have an Lt/Dt ratio, where Lt is the length of the catalyst bearing portion of the tube and Dt is the inside diameter of the tube, of at least 180, or at least 220, or at least 260, or at least 300. It will be appreciated by those skilled in the art that the reforming catalyst can be any catalyst suitable for converting the reactant feed gas into a reformed product gas comprising carbon monoxide, carbon dioxide, and hydrogen.

In one or more embodiments, the catalyst support grid containing the shift catalyst bed can be held in place by one or more tie rods. The tie rods can be secured to the tube sheet by any suitable method, such as for example by welding, bolting, riveting, or the like. The location of the catalyst bed along the length of the exchanger can be varied depending upon the conditions within the shell side of the exchanger and the composition of the gases therein. In certain embodiments, the catalyst bed can be located such that the temperature at the inlet of the catalyst bed can be from about 700° C. to about 800° C., or from about 725° C. to about 775° C., or about 750° C.

It will be appreciated by those skilled in the art that the shift catalyst can be any catalyst suitable for selectively converting carbon monoxide to carbon dioxide. Illustrative shift catalysts can be or include, but are not limited to, metals such as platinum, palladium, copper, oxides of alkali metals such as potassium or sodium, oxides of an alkaline earth metal such as barium, oxides of magnesium, manganese, aluminum, zirconium, lanthanum, cerium, praseodymium and neodymium, or any combination thereof. The metal(s) and/or oxide(s) can be on or imbedded in a support of a refractory material such as alumina or a calcium aluminate. The shift catalyst can convert carbon monoxide to carbon dioxide with no or minimal methanation. Examples of suitable shift catalysts can include, but are not limited to, those discussed and described in U.S. Pat. No. 5,030,440 and U.S. Patent Application Publication No. 2001/0055560. Similarly, the shift catalyst can be in any form or shape so long as it can be suitable for use in the configuration of the shift reactor discussed and described herein, particularly within the dimensions of the catalyst support grid that contains the shift catalyst. For example, the catalyst can be in the form of spheres, rings, pellets, or any other suitable shape.

The shift catalyst bed can be fully packed or only partially packed with shift catalyst. For example, the positioning and/or packing of the shift catalyst bed can be such that at least a portion of tubes concurrent with the packed portion of the shift catalyst bed can be left empty (i.e., not containing reforming catalyst). In another example, the positioning and/or packing of the shift catalyst bed can be such that the portion of tubes concurrent with the packed portion of the shift catalyst bed can be left empty (i.e., not containing reforming catalyst). In particular, in one or more embodiments the shift catalyst bed can be located generally at the top of the shell side of the reforming exchanger, while the tubes are filled with reforming catalyst to a point such that the top portion of the tubes (the portion concurrent with the shift catalyst bed) remains empty. In these embodiments, the exothermic nature of the shift reaction provides preheating of the feed gas in the tubes before the feed gas reaches the portion of the tubes containing the reforming catalyst.

In one or more embodiments, the tube sheet can be adapted to enable loading and unloading of the shell-side shift catalyst bed. For example, in conventional configurations, the tube sheet can define a plurality of holes, each of which holds a tube in the tube bundle. The tube sheets disposed within the reforming exchangers discussed and described herein can be adapted such that a fraction of the holes are not provided with tubes but are instead closed with plugs, caps, or other sealing mechanisms that can be removed for loading and unloading of catalyst and replaced prior to operation of the reforming exchanger. In certain embodiments, one out of every 3 or 4 holes can be plugged in such a manner. Alternately, from about 10% to about 50%, or from about 20% to about 40%, or from about 25% to about 33% of the holes in the tube sheet can be plugged. The plugged holes can be arranged so that they are evenly spaced throughout the tube sheet, or in any other configuration suitable for efficient catalyst loading and unloading.

In one or more embodiments, the reforming exchangers can further include one or more flow distributors disposed between the shell side fluid inlet and the tube bundle. The flow distributors can be, for example, perforated plates or sheets. Preferably, the one or more flow distributors can be positioned transversely across the vessel.

In some embodiments, the tube bundle can further include one or more longitudinally spaced transverse ring baffles and/or one or more longitudinally spaced tube guides. The ring baffles can have a central flow window, where a portion of the tubes pass through the window and another portion can pass through an annular plate of the baffle. The tube guides can be in the form of transverse lattice support assemblies, which can include first and second sets of parallel lattice support bars adjacent a common plane and extending between the tubes with opposite ends of the support bars secured to a lattice support ring. The parallel lattice support bars in the first set can be transverse to the parallel lattice support bars in the second set. The tube bundle can additionally comprise tie rods to maintain the lattice support assemblies ies in longitudinal displacement with respect to the tube sheet.

In alternate embodiments, however, the need for ring baffles and tube guides can be reduced or eliminated due to the presence of the packed catalyst bed on the shell side of the exchanger. In such embodiments, the catalyst bed can serve to maintain the placement and separation of the tubes in lieu of or in addition to the baffles and/or tube guides.

It will be appreciated by those skilled in the art that it can be undesirable to position the shift catalyst bed too close to the shell side fluid outlet, where cross flow can occur as the product gas collects at the shell side fluid outlet. Further, the shell side layout, including the layout of the catalyst bed and the catalyst support grid, and the size and shape of the shift catalyst can be optimized in such a manner as to avoid fluidization of the shift catalyst.

FIG. 1 depicts a cross-sectional side elevation view of an illustrative reforming exchanger 100 with a shell-side shift catalyst bed 160, according to one or more embodiments. The reforming exchanger 100 can be a syngas reforming exchanger. The reforming exchanger 100 can be in the form of a vessel with an elongated shell having a first or relatively high temperature end 102 and a second or relatively low temperature end 104. A shell side fluid inlet 110 can be adjacent to the first end 102 of the reforming exchanger 100. The shell side fluid inlet 110 can allow a hot gas feed 112 to enter the reforming exchanger 100. A tube side fluid inlet 120 can be adjacent to the second end 104 of the reforming exchanger 100. The tube side fluid inlet 120 can allow a reactant feed gas 122 to enter the reforming exchanger 100. A shell side fluid outlet 140 can be fluidly isolated from the tube side fluid inlet 120 by one or more tube sheets 150. The shell side fluid outlet 140 can be adjacent to the second end 104 of the reforming exchanger 100. The shell side fluid outlet 140 can allow a cooled product gas mixture 142 to be discharged from the reforming exchanger 100.

The reforming exchanger 100 can include a tube bundle including one or more tubes 130 having an inlet end secured to the tube sheet 150 and an outlet end located adjacent to the shell side fluid inlet 110. The tubes 130 can contain one or more reforming catalysts 132. A heat resistant refractory lining (not shown) can optionally be affixed to an interior surface of the shell about the tube bundle. A flow distributor 170 can be disposed laterally between the shell-side fluid inlet 120 and the tube bundle.

The catalyst bed 160 can be disposed within the shell side of the reforming exchanger 100. The catalyst bed 160 can be contained in a catalyst support bed 162. The catalyst bed 160 can include one or more shift catalyst as discussed and described above for selectively converting carbon monoxide in a shell side gas mixture to carbon dioxide.

FIG. 2 depicts a cross-sectional side elevation of another illustrative reforming exchanger 200 in which pre-heating of the reactant feed gas 122 to the exchanger 200 takes place in the tubes 130 adjacent to the shell-side catalyst bed 160, according to one or more embodiments. The reforming exchanger 200 of FIG. 2 is a variation on the syngas reforming exchanger 100 depicted in FIG. 1, and can be therefore best understood with reference to FIG. 1. In syngas reforming exchanger 200, the tubes 130 are partially filled with reforming catalyst 132 so that the portion of the tubes concurrent with or adjacent to the shift catalyst 160 remains empty. In this manner, reactant feed gas 122 entering the tubes can be preheated before entering the portion of the tubes containing the reforming catalyst 132.

Figure 3:
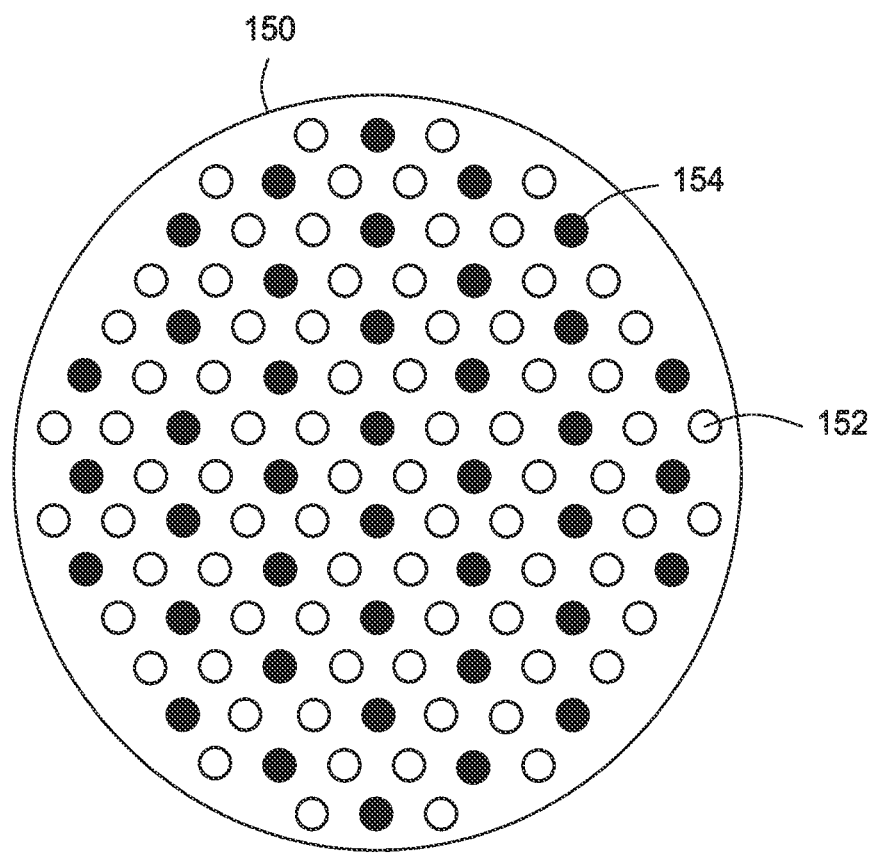
FIG. 3 depicts a top view of a tube sheet used in an embodiment of a reforming exchanger having a plurality of tubes, according to one or more embodiments described.

FIG. 3 depicts a top view of a tube sheet 150 that can be used in an embodiment of a reforming exchanger having a plurality of tubes, according to one or more embodiments. The tube sheet 150 can enable or facilitate the loading and unloading of the shift catalyst bed 160 discussed and described above with reference to FIGS. 1 and 2. As shown in FIG. 3, the tube sheet 150 can be provided having a plurality of holes (un-shaded holes 152 and shaded holes 154). The un-shaded holes 152 can be provided with tubes as illustrated FIGS. 1 and 2. The shaded holes 154 can be left open to accommodate loading and unloading of the shift catalyst bed 160. Holes 154 can be sealed with plugs, caps, or other removable sealing mechanisms (not shown) during operation of the reforming exchanger so as to maintain isolation of the shell side fluid from the tube side fluid.

Reforming exchangers according to the present invention can optionally include additional features not illustrated in the figures discussed and described herein. Some of these additional features and embodiments can be as discussed, described, and illustrated U.S. Pat. Nos. 6,855,272 and 7,635,456.

For example, a discharge annulus can be defined between a flow sleeve disposed about the tube bundle and an enlarged end of the shell adjacent the shell-side fluid outlet, and in fluid communication between the shell-side flow path and the shell-side fluid outlet. The flow sleeve can have an open end and a sealed end. The open end can be spaced from the tube sheet in communication with the shell-side fluid outlet, while the sealed end forms a seal with the shell refractory lining at a base of the discharge annulus.

In one or more embodiments, the syngas reforming exchanger can include a flange assembly adjacent to the low temperature end. The flange assembly can be secured to the tube sheet using a support member. An example support member can include an annular lip mounted in the flange assembly, and a skirt that can extend from and can be secured to the lip at one end and secured to the tube sheet at an opposite end. A tube sheet refractory lining can be located on a shell-side face of the tube sheet, and/or a skirt refractory lining can be located on an inside face of the skirt extending from adjacent the lip to the tube sheet. The syngas reforming exchanger can include a seal between the tube sheet refractory lining and an upper end of the shell refractory lining to inhibit shell side fluid entry into an annulus between the skirt and an inner wall of the vessel. As an example, the tube sheet refractory lining can be surfaced with a high temperature, erosion-resistant cap. The tube bundle can be removable from the shell.

In an embodiment, the seal between the shell refractory lining and the discharge annulus can be formed by a base ring extending outwardly from the flow sleeve, and a seal between the base ring and a transverse annular surface formed in shell refractory lining at the base of the discharge annulus.

The reforming exchangers 100 and/or 200 including the elongated shell having the first and second ends 102, 104, respectively, as discussed and described above, can be used to reform a hydrocarbon to produce a syngas. The process can include the steps of supplying a reactant feed gas to a tube side fluid inlet adjacent the second end of the reforming exchanger, supplying a hot gas feed to a shell side fluid inlet adjacent the first end of the reforming exchanger, passing the reactant feed gas through a tube bundle comprising a plurality of tubes, where the tubes have an inlet end secured to a tube sheet adjacent the second end of the reforming exchanger and an outlet end adjacent the shell side fluid inlet, reforming the reactant feed gas in the tubes to form a reformed product gas, discharging the reformed product gas from the tubes into the hot gas feed to form a gas mixture on the shell side of the reforming exchanger adjacent the shell side fluid inlet, passing the gas mixture from the first end of the reforming exchanger to the second end of the exchanger through a catalyst bed on the shell side of the reforming exchanger having one or more shift catalysts for selectively converting CO in the gas mixture to carbon dioxide, forming a reduced carbon monoxide ("reduced-CO") product gas mixture, and recovering the reduced-CO product gas mixture from a shell side fluid outlet adjacent the second end of the reforming exchanger, where the shell side fluid outlet can be fluidly isolated from the tube side fluid inlet by the tube sheet. The reduced-CO product gas mixture can contain less carbon monoxide compared to the gas mixture prior to passing the gas mixture through the catalyst bed.

In one or more embodiments, the reactant feed gas 122 can include one or more hydrocarbons, steam, or any combination thereof. The one or more hydrocarbons can include, but are not limited to, methane, ethane, propane, butane, pentane, or any combination thereof. The temperature of the reactant feed gas 122 can be above the dew point of the feed gases. The temperature of the reactant feed gas 122 can range from about 300° C. to about 450° C. or from about 350° C. to about 400° C. In the same or other embodiments, the tubes 130 can include the catalyst 132 disposed within the tubes 130 for converting the reactant feed gas to reformed product gas. As such, the reactant feed gas 122 can be at least partially reformed in the tubes 130, resulting in a reformed product gas that can include hydrogen, carbon monoxide, carbon dioxide, or any combination thereof. The reformed product gas can also include residual hydrocarbons not reacted in the tubes.

The residual hydrocarbons can include, but are not limited to, methane, ethane, propane, butane, pentane, or any combination thereof.

The hot gas feed 112 can be any fluid suitable for providing a heat source to the reforming exchanger 100 and/or 200. Such hot gas feeds can include, but are not limited to, effluent streams from autothermal reformers, secondary reformers, and/or steam methane reformers. Other sources of suitable hot gas feeds can be or include effluents from partial oxidation reactors, catalytic partial oxidation reactors, gasifiers, and the like. Any combination of effluents can be used as the hot gas feed 112. The temperature of the hot gas feed 112 can generally be from about 600° C. to about 1,050° C. or from about 650° C. to about 1,000° C.

In one or more embodiments, the gas mixture formed from mixing the reformed product gas and the but gas feed can be passed from the first end 102 of the reforming exchanger 100 and/or 200 to the second end 104 of the reforming exchanger 100 and/or 102 through the shift catalyst bed 160 on the shell side of the reforming exchanger 100 and/or 200 following a longitudinal flow path. The gas mixture can be in direct contact with the shift catalyst, promoting a shift reaction that converts CO in the gas mixture to carbon dioxide ($CO_2$). This results in a gas having a reduced carbon monoxide concentration ("reduced-CO product gas mixture"), which in turn results in a decrease in the critical Boudouard reaction equilibrium temperature for carbon formation and allows for further cooling of the shell-side gas. Because the temperature of the shell-side gas can be reduced, more sensible heat can be recovered for reforming in the tube side of the reforming exchangers 100 and/or 200 without increasing the risk of metal dusting and the operating envelope of the exchangers 100 and/or 200 can be widened to include pressures and temperatures previously undesirable due to the risk of metal dusting. Further, the cost of the exchanger can be reduced because lower operating temperatures can allow for the use of thinner or different metals for the tubes, tube sheet, and other components of the exchanger. Another benefit of employing a bed of shift catalyst on the shell side of the exchanger can be that increased reforming takes place because the exothermic nature of the shift reaction creates favorable conditions for heat transfer in the exchanger.

In one or more embodiments, the temperature of the reduced-CO product gas mixture 142 recovered from the shell side fluid outlet 140 of the reforming exchangers 100 and/or 200 can generally be from about 400° C. to about 580° C. or from about 440° C. to about 540° C.

Figure 4:
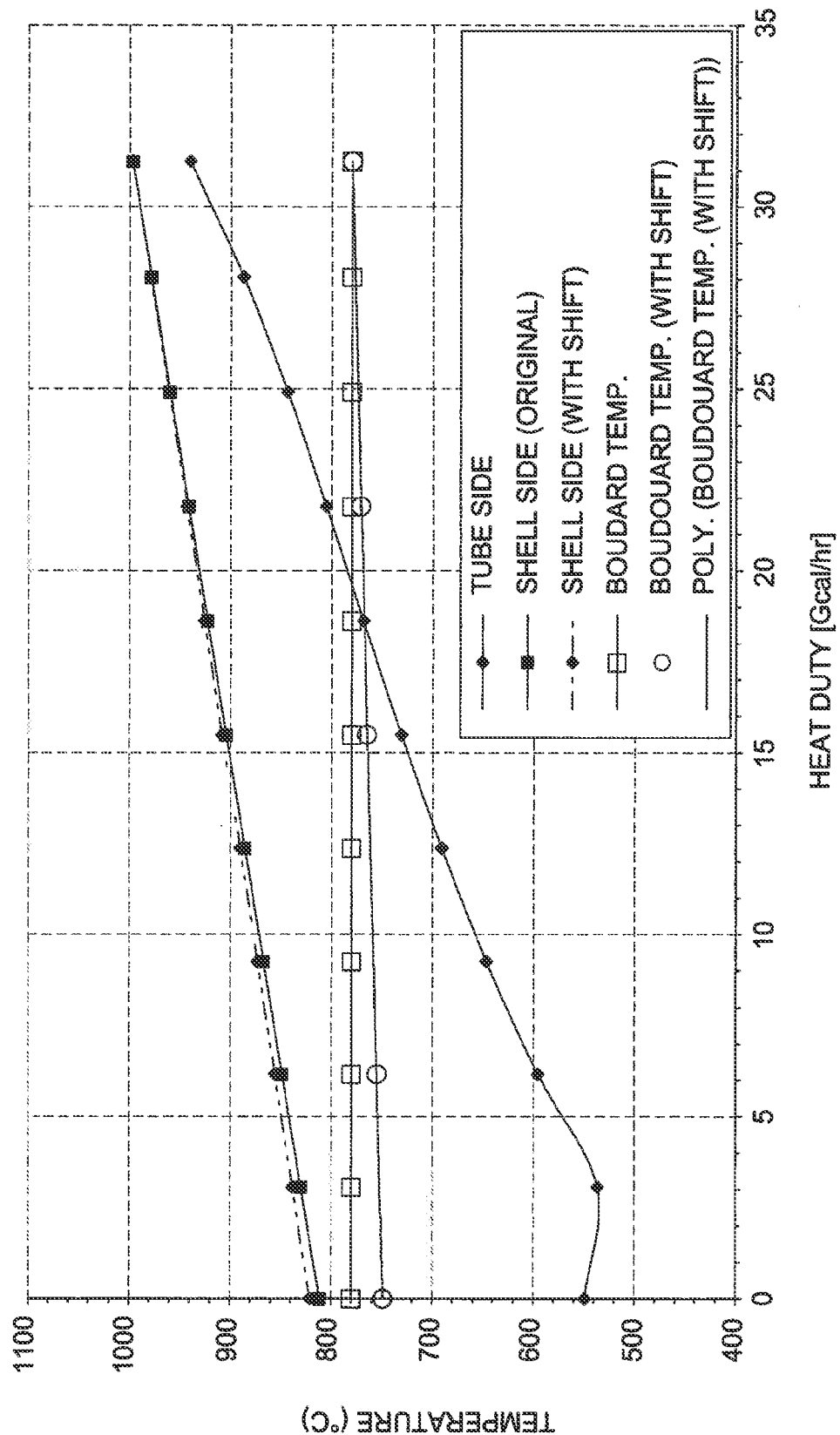
FIGS. 4, 5, and 6 depict temperature versus heat duty for operation of reforming exchangers representing three embodiments of the invention compared to similar exchangers not having a bed of shift catalyst on the shell side of the exchanger, according to one or more embodiments described.
Figure 5:
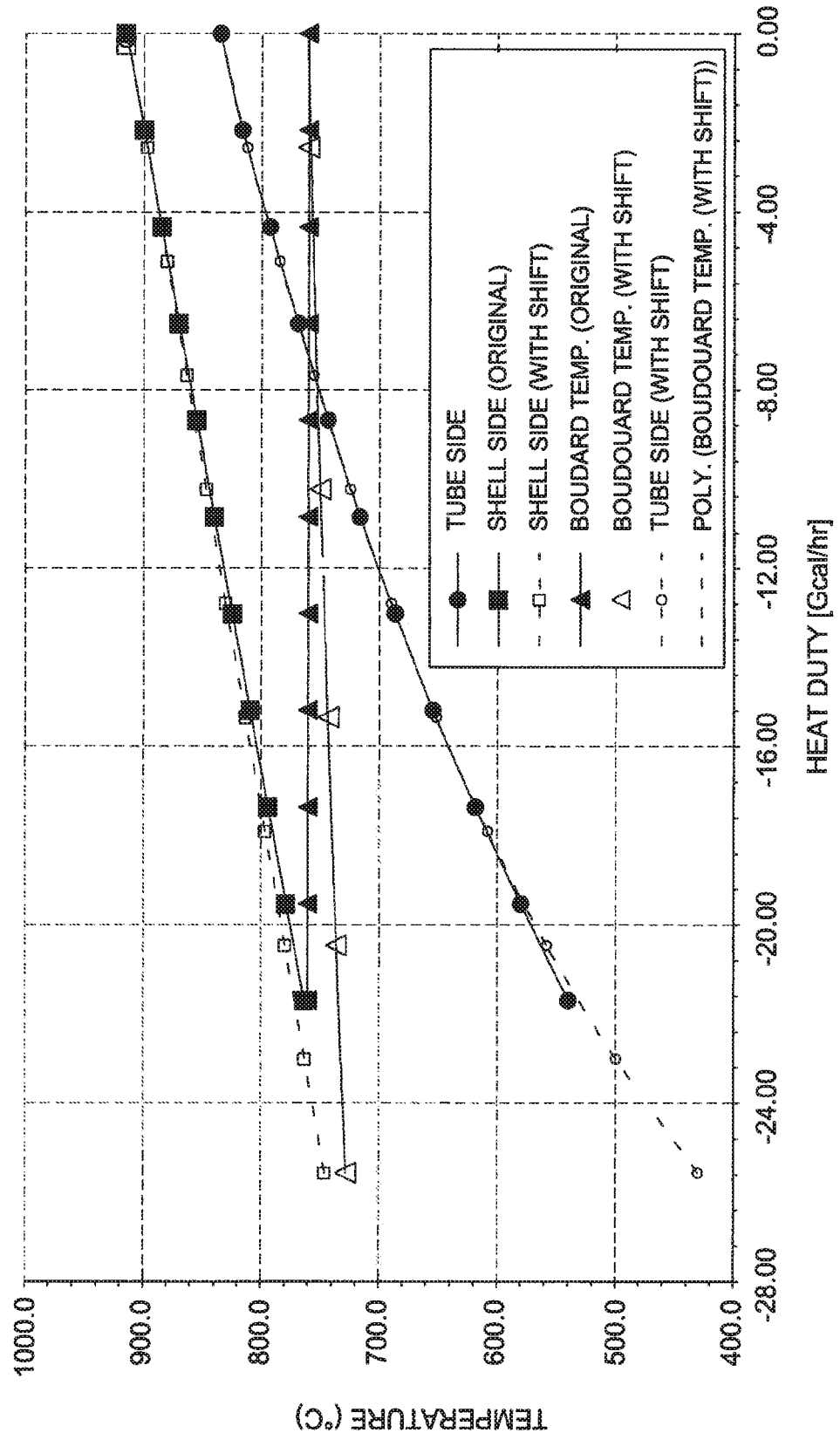
Figure 6:
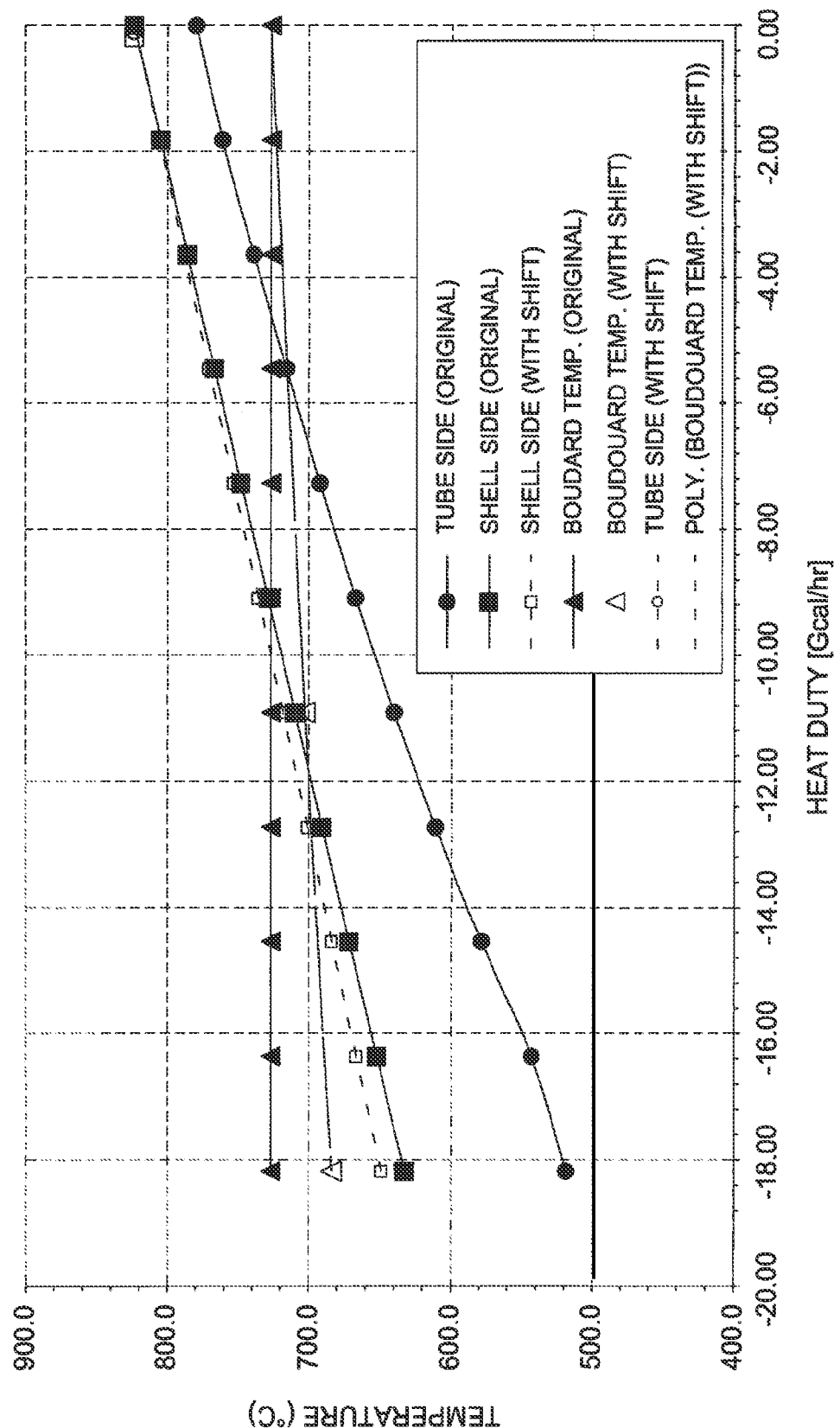

FIGS. 4, 5, and 6 depict temperature versus heat duty for the operation of reforming exchangers representing three embodiments of the invention when compared to similar exchangers not having a bed of shift catalyst on the shell side of the exchanger. The left side of the graphs correspond to the temperature at the second end 104 of the reforming exchanger and the right side of the graphs correspond to the temperature at the first end 102 of the reforming exchanger. As shown in FIGS. 4-6, inclusion of a shift catalyst bed on the shell side of the exchanger can result in a decrease in the critical Boudouard reaction equilibrium temperature for carbon formation, thus allowing for additional cooling of the shell-side gas without increased risk of metal dusting.

Embodiments discussed and described herein further relate to any one or more of the following paragraphs:

1. A syngas reforming exchanger, comprising: a vessel comprising an elongated shell having a first end and a second end; a shell side fluid inlet adjacent the first end for receiving a hot gas feed; a tube side fluid inlet adjacent the second end for receiving a reactant feed gas; a shell side fluid outlet fluidly isolated from the tube side fluid inlet by a tube sheet adjacent the second end for discharging a reduced carbon monoxide product gas mixture; a tube bundle comprising a plurality of tubes, wherein the tubes have an inlet end secured to the tube sheet for receiving the reactant feed gas and an outlet end adjacent the shell side fluid inlet for discharging a reformed product gas into the hot gas feed to form a gas mixture; and one or more shift catalysts for converting carbon monoxide to carbon dioxide in the gas mixture to produce the reduced carbon monoxide product gas mixture, wherein the shift catalyst is contained on the shell side of the reforming exchanger.

2. The syngas reforming exchanger according to paragraph 1, further comprising a longitudinal shell side flow path for the gas mixture.

3. The syngas reforming exchanger according to paragraph 1 or 2, further comprising catalyst-bearing monolithic structures disposed within the tubes for converting the reactant feed gas to the reformed product gas.

4. The syngas reforming exchanger according to paragraph 3, wherein the tubes have an Lt/Dt ratio of at least about 300, wherein Lt is the length of the catalyst bearing portion of the tubes and Dt is the inside diameter of the tubes.

5. The syngas reforming exchanger according to paragraph 3 or 4, wherein the catalyst-bearing monolithic structures are disposed within the tubes such that at least a portion of the tubes concurrent with the shift catalyst remains empty.

6. The syngas reforming exchanger according to any one of paragraphs 1 to 5, wherein the shift catalyst is contained in a catalyst support grid.

7. The syngas reforming exchanger according to paragraph 6, wherein the catalyst support grid is held in place by one or more tie rods secured to the tube sheet.

8. The syngas reforming exchanger according to any one of paragraphs 1 to 7, wherein the shift catalyst is in the form of spheres, rings, pellets, or any combination thereof.

9. The syngas reforming exchanger according to any one of paragraphs 1 to 8, further comprising a flow distributor disposed between the shell side fluid inlet and the outlet end of the tube bundle.

10. A process for the production of syngas in a reforming exchanger comprising an elongated shell having a first end and a second end, wherein the process comprises: supplying a reactant feed gas to a tube side fluid inlet adjacent the second end of the reforming exchanger; supplying a hot gas feed to a shell side fluid inlet adjacent the first end of the reforming exchanger; passing the reactant feed gas through a tube bundle comprising a plurality of tubes, wherein the tubes have an inlet end secured to a tube sheet adjacent the second end of the reforming exchanger and an outlet end adjacent the shell side fluid inlet; reforming the reactant feed gas in the tubes to form a reformed product gas; discharging the reformed product gas from the tubes into the hot gas feed to form a gas mixture on the shell side of the reforming exchanger adjacent the shell side fluid inlet; passing the gas mixture from the first end of the reforming exchanger to the second end of the reforming exchanger through a catalyst bed on the shell side of the reforming exchanger, wherein the catalyst bed comprises one or more shift catalysts for selectively converting carbon monoxide in the gas mixture to carbon dioxide, forming a reduced carbon monoxide product gas mixture; and recovering the reduced carbon monoxide product gas mixture from a shell side fluid outlet adjacent the second end of the reforming exchanger, wherein the shell side fluid outlet is fluidly isolated from the tube side fluid inlet by the tube sheet.

11. The process according to paragraph 10, wherein the flow path of the gas mixture from the first end of the reforming exchanger to the second end of the reforming exchanger on the shell side is longitudinal.

12. The process according to paragraph 10 or 11, wherein the tubes comprise catalyst-bearing monolithic structures disposed within the tubes for converting the reactant feed gas to the reformed product gas.

13. The process according to any one of paragraphs 10 to 12, further comprising preheating the reactant feed gas in the tubes prior to reforming the reactant feed gas.

14. The process according to any one of paragraphs 10 to 13, wherein the temperature of the reactant feed gas supplied to the tube side fluid inlet is from about 300° C. to about 450° C.

15. The process according to any one of paragraphs 10 to 14, wherein the temperature of the reactant feed gas supplied to the tube side fluid inlet is from about 350° C. to about 400° C.

16. The process according to any one of paragraphs 10 to 15, wherein the temperature of the reduced carbon monoxide gas mixture from the shell side fluid outlet is from about 400° C. to about 580° C.

17. The process according to any one of paragraphs 10 to 16, wherein the temperature of the reduced carbon monoxide gas mixture from the shell side fluid outlet is from about 440° C. to about 540° C.

18. A syngas reforming exchanger comprising: a vessel comprising an elongated shell having relatively high and low temperature ends; a shell side fluid inlet adjacent the high temperature end for receiving a hot gas feed; a tube side fluid inlet adjacent the low temperature end for receiving a reactant feed gas; a shell side fluid outlet fluidly isolated from the tube side fluid inlet by a tube sheet adjacent the low temperature end for discharging reduced carbon monoxide product gas mixture; a tube bundle comprising a plurality of tubes, wherein the tubes have an inlet end secured to the tube sheet for receiving the gas feed mixture and an outlet end adjacent the shell side fluid inlet for discharging reformed product gas into the hot gas feed to form a gas mixture; and one or more shift catalysts for converting carbon monoxide to carbon dioxide in the gas mixture to produce a reduced carbon monoxide product gas mixture, wherein the shift catalyst is contained on the shell side of the reforming exchanger.

19. The syngas reforming exchanger according to paragraph 18, further comprising a longitudinal shell side flow path for the gas mixture; catalyst-bearing monolithic structures disposed within the tubes for converting the reactant feed gas to the reformed product gas; and a flow distributor disposed between the shell side fluid inlet and the outlet end of the tube bundle.

20. The syngas reforming exchanger according to paragraph 19, wherein the catalyst-bearing monolithic structures are disposed within the tubes such that the portion of the tubes concurrent with the shift catalyst remains empty.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing description of the invention is illustrative and explanatory of the present invention. Various changes in the materials, apparatus, and process employed will occur to those skilled in the art. It is intended that all such variations within the scope and spirit of the appended claims be embraced thereby.

What is claimed is:

1. A process for the production of syngas in a reforming exchanger comprising an elongated shell having a first end and a second end, wherein the process comprises:
   supplying a reactant feed gas to a tube side fluid inlet adjacent the second end of the reforming exchanger;
   supplying a hot gas feed to a shell side fluid inlet adjacent the first end of the reforming exchanger;
   passing the reactant feed gas through a tube bundle comprising a plurality of tubes that contain a reforming catalyst, wherein the tubes have an inlet end secured to a tube sheet adjacent the second end of the reforming exchanger and an outlet end adjacent the shell side fluid inlet;
   reforming the reactant feed gas in the tubes to form a reformed product gas;
   discharging the reformed product gas from the tubes into the hot gas feed to form a gas mixture on the shell side of the reforming exchanger adjacent the shell side fluid inlet;
   passing the gas mixture from the first end of the reforming exchanger to the second end of the reforming exchanger through a catalyst bed on the shell side of the reforming exchanger, wherein the catalyst bed comprises one or more shift catalysts for selectively converting carbon monoxide in the gas mixture to carbon dioxide, forming a reduced carbon monoxide product gas mixture wherein the shift catalyst bed is in contact with the tubes outer walls, and wherein the portion of the tubes concurrent with the shift catalyst bed is void of the reforming catalyst; and
   recovering the reduced carbon monoxide product gas mixture from a shell side fluid outlet adjacent the second end of the reforming exchanger, wherein the shell side fluid outlet is fluidly isolated from the tube side fluid inlet by the tube sheet.

2. The process of claim 1, wherein the flow path of the gas mixture from the first end of the reforming exchanger to the second end of the reforming exchanger on the shell side is longitudinal.

3. The process of claim 1, wherein the tubes comprise catalyst-bearing monolithic structures disposed within the tubes for converting the reactant feed gas to the reformed product gas.

4. The process of claim 1, further comprising preheating the reactant feed gas in the tubes prior to reforming the reactant feed gas.

5. The process of claim 1, wherein the temperature of the reactant feed gas supplied to the tube side fluid inlet is from about 300° C. to about 450° C.

6. The process of claim 5, wherein the temperature of the reactant feed gas supplied to the tube side fluid inlet is from about 350° C. to about 400° C.

7. The process of claim 1, wherein the temperature of the reduced carbon monoxide product gas mixture from the shell side fluid outlet is from about 400° C. to about 580° C.

8. The process of claim 7, wherein the temperature of the reduced carbon monoxide product gas mixture from the shell side fluid outlet is from about 440° C. to about 540° C.

* * * * *